(12) United States Patent
Tsai et al.

(10) Patent No.: US 11,560,214 B2
(45) Date of Patent: Jan. 24, 2023

(54) TELESCOPING MECHANISMS FOR CONTROL OF AERODYNAMIC SURFACES

(71) Applicant: The Boeing Company, Chicago, IL (US)

(72) Inventors: Kevin Raylin Tsai, Seattle, WA (US); Mark Steven Good, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/370,509

(22) Filed: Jul. 8, 2021

(65) Prior Publication Data

US 2022/0081102 A1 Mar. 17, 2022

Related U.S. Application Data

(60) Provisional application No. 63/078,350, filed on Sep. 15, 2020.

(51) Int. Cl.
*B64C 13/32* (2006.01)
*B64C 9/24* (2006.01)
*B64C 9/02* (2006.01)

(52) U.S. Cl.
CPC ............... *B64C 13/32* (2013.01); *B64C 9/02* (2013.01); *B64C 9/24* (2013.01)

(58) Field of Classification Search
CPC .. B64C 13/32; B64C 9/02; B64C 9/24; B64C 13/34
See application file for complete search history.

(56) References Cited

U.S. PATENT DOCUMENTS

| 4,471,928 | A | 9/1984 | Cole | |
|---|---|---|---|---|
| 4,650,140 | A | 3/1987 | Cole | |
| 5,544,847 | A | 8/1996 | Bliesner | |
| 2007/0102587 | A1 | 5/2007 | Jones et al. | |
| 2009/0146016 | A1* | 6/2009 | Kordel | B64C 9/16 244/215 |
| 2015/0060607 | A1* | 3/2015 | Havar | B64C 9/02 244/99.2 |
| 2016/0176508 | A1* | 6/2016 | Fevergeon | B64C 9/16 244/99.3 |
| 2018/0162516 | A1* | 6/2018 | Brown | F16H 49/001 |
| 2019/0382099 | A1* | 12/2019 | Iliescu | B64C 9/02 |

* cited by examiner

*Primary Examiner* — Rodney A Bonnette
(74) *Attorney, Agent, or Firm* — Quinn IP Law (57) ABSTRACT

An actuation apparatus for an aerodynamic surface includes a cam track plate having a forward cam track and an aft cam track, a support arm coupled to the leading edge slat panel, the support arm having a forward roller and an aft roller thereon, the forward roller disposed in the forward cam track and the aft roller disposed in the aft cam track, and a bell crank pivotally mounted to the cam track plate, the bell crank having an aft end coupled by an aft link to the wing structure and a forward end coupled by a forward link to the support arm. The forward roller translates within the forward cam track and the aft roller translates within the aft cam track to cause downward rotation of the aerodynamic surface and increased camber of the aerodynamic surface as the aerodynamic surface is extended toward a deployed position.

20 Claims, 10 Drawing Sheets

TELESCOPING MECHANISMS FOR CONTROL OF AERODYNAMIC SURFACES

CROSS-REFERENCE TO RELATED APPLICATION

This application claims the benefit of U.S. Provisional Patent Application No. 63/078,350, filed Sep. 15, 2020, which is incorporated by reference herein in its entirety.

INTRODUCTION

The present disclosure relates to the field of aircraft wing systems and telescoping mechanisms for controlling a leading edge or trailing edge aerodynamic surface.

Slats are small aerodynamic surfaces on the leading edge of an airplane wing. Leading edge slats are used for altering the aerodynamic shape of a wing airfoil section. In a normal cruise configuration, the leading edge slats are placed in a retracted position to provide the fixed wing an optimized aerodynamic configuration. During take-off and climbing, the leading edge slats are moved forward to an intermediate location to extend the effective chord length of the wing. This improves lift performance of the wing while keeping drag within reasonable limits. In a high lift configuration, the leading edge slats are generally moved further forward from the takeoff and climb position so that the slat has a greater downward slant to increase the camber of the slat/wing combination.

Due to the limited stowage volume in the wing cross-section, actuation systems and mechanisms for moving and positioning the leading edge slats in the wing tend to take up a large amount of area in the wing cross-section. Newer airplanes are developing more aerodynamically aggressive wing lofts in order to achieve greater performance. Thus, newer wing designs are getting smaller while loading of the flight control surfaces remain the same. The combination of a shorter chord for the fixed leading edge structure as well as a reduced front spar height, and relatively high flight control surface loads make the integration of actuation systems for moving and positioning the leading edge slats in the wing extremely difficult.

For the slat to be effective, the slat often has a long distance trajectory. This in turn results in long tracks which penetrate the front spar of the wing. The penetration through the front spar compromises the structural integrity of the spar, as well as creates undesirable opportunities for interaction with the fuel stored in the wing.

SUMMARY

Embodiments according to the present disclosure provide a number of advantages. For example, embodiments according to the present disclosure include a rotating track having two sets of cam surfaces that enable a long distance trajectory of an aerodynamic surface, such as the leading edge slat, using a smaller mechanism that does not penetrate the front spar of the wing. The two sets of cam surfaces create additional degrees of freedom without the use of a second actuator. The additional degrees of freedom enable the slat to be "sealed" or minimally gapped relative to the fixed wing in the takeoff position, and to be optimally "gapped" relative to the fixed wing in the landing configuration. In various embodiments, a bell crank linkage provides related rates of extension between the rotating track and the leading edge slat. The embodiments according the present disclosure include a compact mechanism that fits within the wing without a fairing and can be extended to increase wing chord and camber without penetrating the spars. That is, when retracted, the mechanism has a compact fore/aft length, and when deployed, the mechanism telescopes to reach out and downward (or upward) to enable better aero positioning of the aerodynamic surface.

In one aspect of the present disclosure, an actuation apparatus for a leading edge slat panel for an aircraft includes a pinion gear rotatably coupled to a wing structure of the aircraft, a curved track having a gear rack engaged with the pinion gear, a cam track plate coupled to the curved track, the cam track plate having a forward cam track and an aft cam track, a support arm coupled to the leading edge slat panel, the support arm having a forward roller and an aft roller thereon, the forward roller disposed in the forward cam track and the aft roller disposed in the aft cam track, and a bell crank pivotally mounted to the cam track plate, the bell crank having an aft end couplable by an aft link to the wing structure and a forward end coupled by a forward link to the support arm. The curved track and cam track plate are movable fore and aft by the engagement of the gear rack with the pinion gear and forward movement of the curved track and cam track plate rotates the bell crank to create forward displacement of the support arm and downward rotation of the leading edge slat panel toward a deployed position.

In some aspects, the forward roller translates within the forward cam track and the aft roller translates within the aft cam track to cause downward rotation of the leading edge slat panel and increased camber of the leading edge slat panel as the leading edge slat panel is extended toward the deployed position.

In some aspects, the forward cam track has a first end and a second end forward of the first end of the forward cam track, and the aft cam track has a first end and a second end forward of the first end of the aft cm track. The second end of the aft cam track is positioned higher relative to the second end of the forward cam track to create increased downward displacement of the forward roller relative to the aft roller when the leading edge slat panel is extended toward the deployed position.

In some aspects, the forward cam track includes a first inflection point and the aft cam track includes a second inflection point such that as the forward roller translates within the forward cam track and the aft roller translates within the aft cam track, the aft roller is lower than the forward roller when the aft roller is at the second inflection point, and the aft roller is higher than the forward roller when the leading edge slat panel is at the deployed position.

In some aspects, the forward cam track extends laterally through the cam track plate to form a forward cam track opening. The aft cam track extends laterally through the cam track plate to form an aft cam track opening. The support arm includes a first support arm member positioned on a first side of the cam track plate and a second support arm member positioned on a second side of the cam track plate.

In some aspects, each of the forward cam track and the aft cam track is a groove formed in a side surface of the cam track plate.

In some aspects, the cam track plate is positionable forward of and translatable fore and aft relative to a forward edge of the wing structure.

In some aspects, the aft link of the bell crank is fixedly couplable to the wing structure and the bell crank both rotates and translates fore and aft relative to the wing structure.

In some aspects, the actuation apparatus further includes a pair of rollers couplable to the wing structure and in bearing contact with the curved track.

In another aspect of the present disclosure, an aircraft wing includes an upper wing surface and a lower wing surface joined by a wing structure, a pinion gear rotatably disposed on the wing structure, a curved track having a gear rack engaged with the pinion gear, a cam track plate coupled to the curved track, the cam track plate having a forward cam track and an aft cam track, an aerodynamic surface coupled to a support arm having a forward roller and an aft roller thereon, the forward roller disposed in the forward cam track and the aft roller disposed in the aft cam track, and a bell crank pivotally mounted to the cam track plate. The bell crank has an aft end coupled by an aft link to the wing structure and a forward end coupled by a forward link to the support arm. The curved track and cam track plate are movable fore and aft by the engagement of the gear rack with the pinion gear and forward movement of the curved track and cam track plate rotates the bell crank to create forward displacement of the support arm and downward rotation of the aerodynamic surface toward a deployed position.

In some aspects, the forward roller translates within the forward cam track and the aft roller translates within the aft cam track to cause downward rotation of the aerodynamic surface and increased camber of the aerodynamic surface as the aerodynamic surface is extended toward the deployed position.

In some aspects, the forward cam track has a first end and a second end forward of the first end of the forward cam track. The aft cam track has a first end and a second end forward of the first end of the aft cam track. The second end of the forward cam track is lower than the second end of the aft cam track to create increased downward displacement of the forward roller relative to the aft roller when the aerodynamic surface is extended toward the deployed position.

In some aspects, the forward cam track includes a first inflection point and the aft cam track includes a second inflection point such that as the forward roller translates within the forward cam track and the aft roller translates within the aft cam track, the aft roller is lower than the forward roller when the aft roller is at the second inflection point, and the aft roller is higher than the forward roller when the slat panel is at the deployed position.

In some aspects, the forward cam track extends laterally through the cam track plate to form a forward cam track opening and the aft cam track extends laterally through the cam track plate to form an aft cam track opening and the support arm includes a first support arm member positioned on a first side of the cam track plate and a second support arm member positioned on a second side of the cam track plate.

In some aspects, the cam track plate is positioned forward of and translates fore and aft relative to a forward edge of the wing structure.

In some aspects, the aft link of the bell crank is fixedly coupled to the wing structure and the bell crank both rotates and translates fore and aft relative to the wing structure.

In some aspects, the aircraft wing further includes a pair of rollers coupled to the wing structure and in bearing contact with the curved track.

In another aspect of the present disclosure, an actuation apparatus for an aerodynamic surface of an aircraft includes a cam track plate having a forward cam track and an aft cam track, a support arm coupled to the aerodynamic surface, the support arm having a forward roller and an aft roller thereon, the forward roller disposed in the forward cam track and the aft roller disposed in the aft cam track, and a bell crank pivotally mounted to the cam track plate, the bell crank having an aft end couplable by an aft link to the wing structure and a forward end coupled by a forward link to the support arm. The forward roller translates within the forward cam track and the aft roller translates within the aft cam track to cause downward rotation of the aerodynamic surface and increased camber of the aerodynamic surface as the aerodynamic surface is extended toward a deployed position.

In some aspects, the forward cam track has a first end and a second end forward of the first end of the forward cam track and the aft cam track has a first end and a second end forward of the first end of the aft cam track. The second end of the forward cam track is lower than the second end of the aft cam track to create increased downward displacement of the forward roller relative to the aft roller when the aerodynamic surface is extended toward the deployed position.

In some aspects, the cam track plate is positionable forward of and translatable fore and aft relative to a forward edge of the wing structure, the aft link of the bell crank is fixedly couplable to the wing structure, and the bell crank is configured to rotate and translate fore and aft relative to the wing structure.

In another aspect of the present disclosure, a method for actuation of a leading edge slat panel for an aircraft includes providing a telescoping mechanism including a cam track plate having a forward cam track and an aft cam track, a support arm coupled to the leading edge slat panel, the support arm having a forward roller and an aft roller thereon, the forward roller disposed in the forward cam track and the aft roller disposed in the aft cam track, and a bell crank pivotally mounted to the cam track plate, the bell crank having an aft end coupled by an aft link to the wing structure and a forward end coupled by a forward link to the support arm. The method also includes rotatably displacing the cam track plate, inducing, via the displacement of the cam track plate, extension of the bell crank, and deploying, via the displacement of the cam track plate and extension of the bell crank, the leading edge slat panel depending from the support arm. Extension of the bell crank causes the forward roller to translate within the forward cam track and the aft roller to translate within the aft cam track to cause downward rotation of the leading edge slat panel and increases the camber of the leading edge slat panel as the leading edge slat panel is extended toward a fully deployed position.

In some aspects, the method further includes providing a pinion gear rotatably coupled to a wing structure of the aircraft and providing a curved track coupled to the cam track plate, the curved track having a gear rack engaged with the pinion gear and rotatably operating the pinion gear to cause the gear rack engaged with the pinion gear to rotatably displace the curved track and the cam track plate in a forward direction.

In some aspects, the method further includes rotatably operating the pinion gear to induce, via displacement of the cam track plate, extension of the bell crank such that the forward roller is positioned within the forward cam track at a first inflection point and the aft roller is positioned within the aft cam track at a second inflection point such that the leading edge slat panel is in a takeoff condition position.

In some aspects, the method further includes rotatably operating the pinion gear to induce, via displacement of the cam track plate, extension of the bell crank such that the forward roller is positioned at a forward end of the forward cam track and the aft roller is positioned at a forward end of the aft cam track such that the leading edge slat panel is in a landing condition position.

In some aspects, the method further includes rotatably displacing the cam track plate forward and aft relative to a forward edge of a wing structure of the aircraft as the leading edge slat panel is positioned between an undeployed and a deployed position.

In another aspect of the present disclosure, an actuation apparatus for an aerodynamic surface of an aircraft includes a roller rotatably coupled to a wing structure of the aircraft, a curved track in movable engagement with the roller, a cam track plate having a forward cam track and an aft cam track, a support arm coupled to the aerodynamic surface, the support arm having a forward roller and an aft roller thereon, the forward roller disposed in the forward cam track and the aft roller disposed in the aft cam track, a bell crank pivotally mounted to the cam track plate, the bell crank having an aft end couplable by an aft link to the wing structure and a forward end coupled by a forward link to the support arm, and an actuator coupled with the aft link. The curved track and cam track plate are movable fore and aft by the actuator coupled with the aft link and the forward roller translates within the forward cam track and the aft roller translates within the aft cam track to cause downward rotation of the aerodynamic surface and increased camber of the aerodynamic surface as the aerodynamic surface is extended toward a deployed position.

In some aspects, the forward cam track and the aft cam track are circular arcs and are concentric with a circular arc defined by the curved track.

In some aspects, the forward cam track has a first end and a second end forward of the first end of the forward cam track and the aft cam track has a first end and a second end forward of the first end of the aft cam track. The second end of the forward cam track is lower than the second end of the aft cam track to create increased downward displacement of the forward roller relative to the aft roller when the aerodynamic surface is extended toward the deployed position.

In some aspects, the forward cam track includes a first inflection point and the aft cam track includes a second inflection point such that as the forward roller translates within the forward cam track and the aft roller translates within the aft cam track, the aft roller is lower than the forward roller when the aft roller is at the second inflection point and the aft roller is higher than the forward roller when the aerodynamic surface is at the deployed position.

In some aspects, the cam track plate is positionable forward of and translatable fore and aft relative to a forward edge of the wing structure and the aft link of the bell crank is fixedly couplable to the wing structure and the bell crank both rotates and translates fore and aft relative to the wing structure.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The embodiments discussed herein feature a mechanism configured to enable the same amount of travel of an aerodynamic surface, such as a leading edge slat, without the mechanism protruding into the front spar of the wing. In various embodiments, the mechanism includes a cam track plate having two sets of cam surfaces that are positioned and shaped to increase the camber of the slat as it is extended to a deployed position. In various embodiments, movement of the slat is controlled by an actuator coupled to a rack and pinion gear set coupled with a movable curved track that is in turn coupled to the cam track plate. In various embodiments, a force acting on a bell crank linkage coupled to the cam track plate enables displacement of the slat between the deployed position and an undeployed position.

Figure 3:
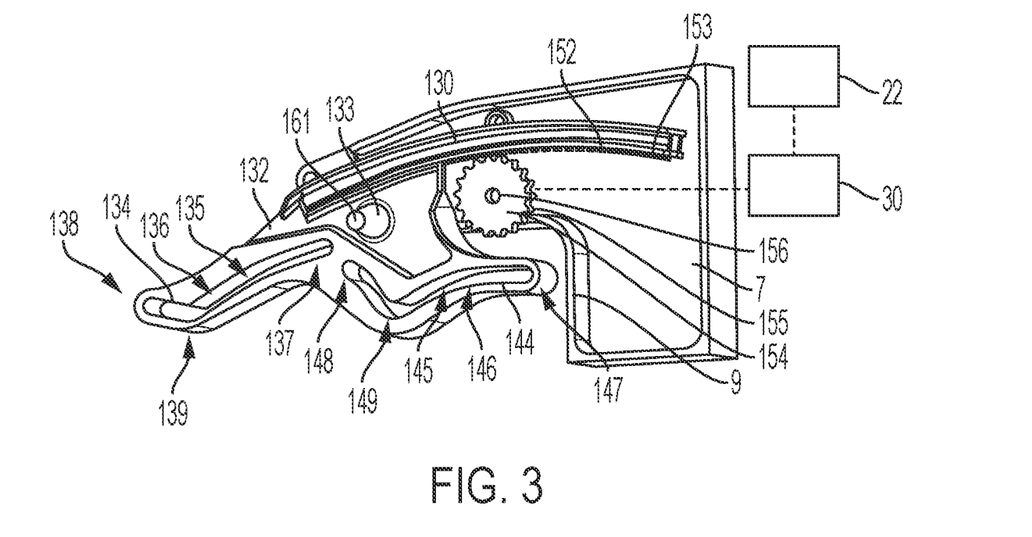
FIG. 3 is a schematic rear perspective representation of components of the telescoping mechanism of FIG. 1.
Figure 4:
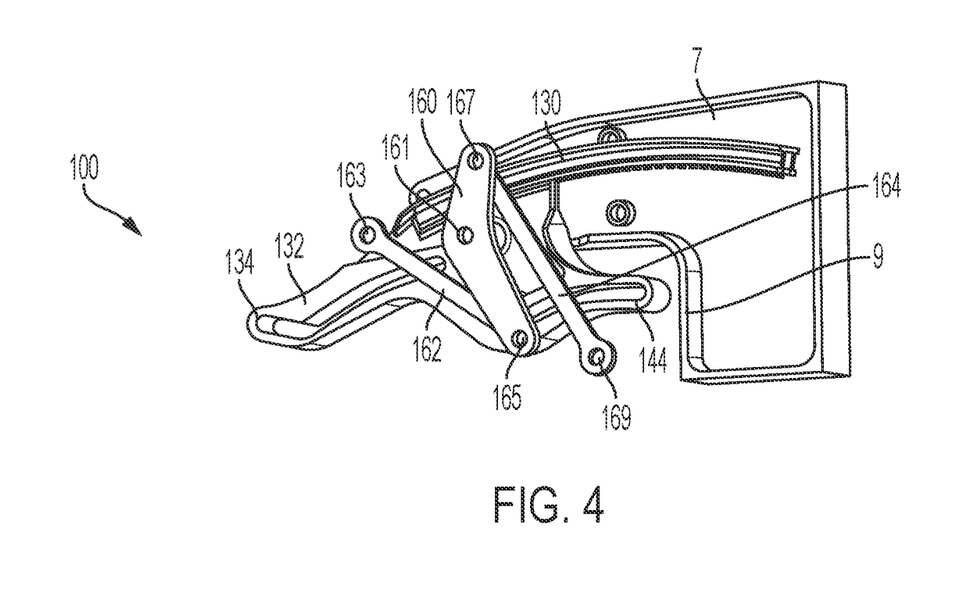
FIG. 4 is a schematic rear perspective representation of components of the telescoping mechanism of FIG. 1.
Figure 5:
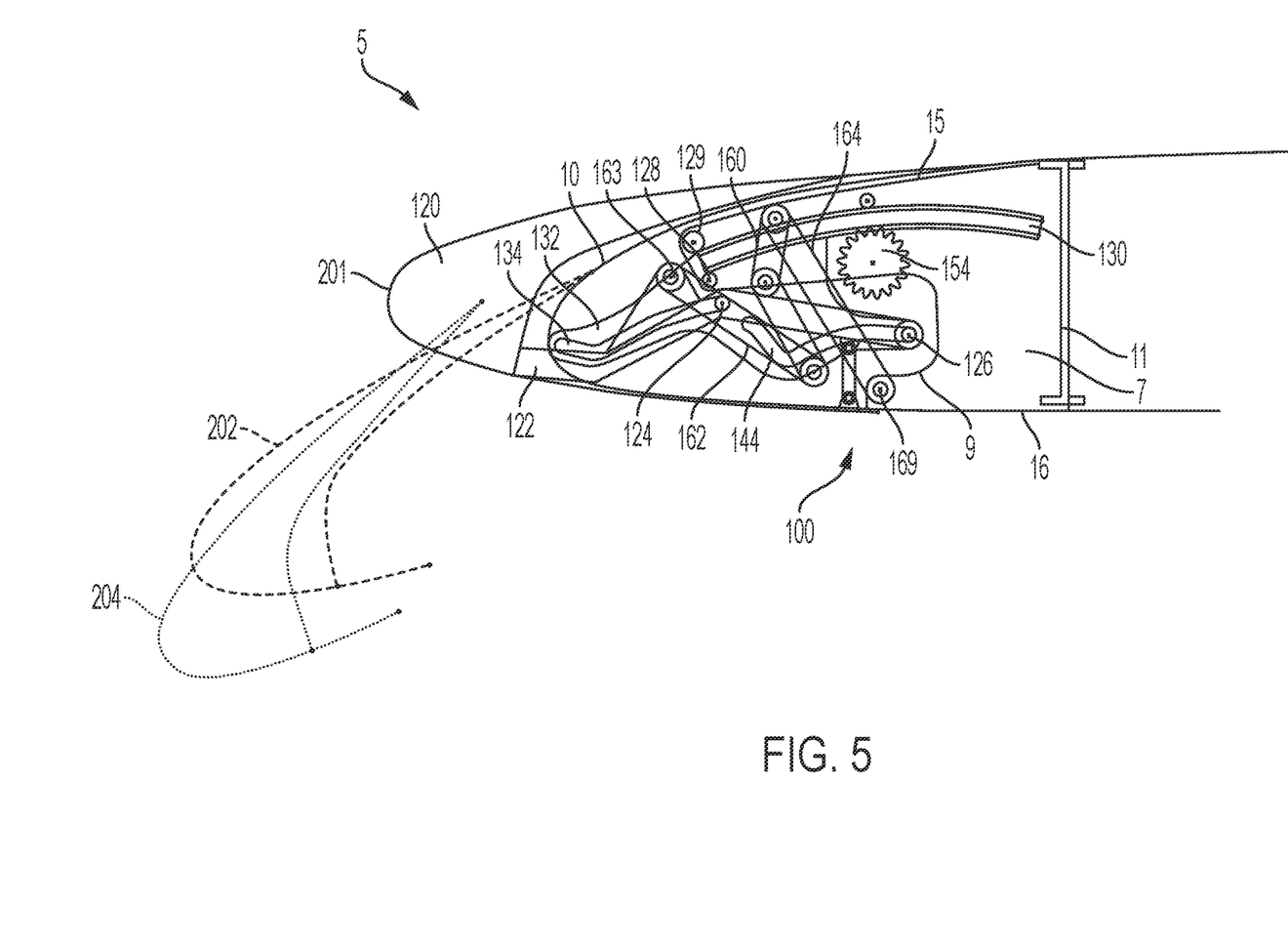
FIG. 5 is a schematic side view representation of the telescoping mechanism in a first position, according to an embodiment.

Referring to the drawings, where like reference numbers refer to like components, an embodiment of a telescoping mechanism 100 for an aircraft wing 5 is shown in FIGS. 1-8. A wing structure 6 of the aircraft wing 5 includes a rib 7 extending from a leading edge 10 to a trailing edge of the wing 5. The rib 7 includes a forward edge 9 and an aft edge 8. As best shown in FIG. 5, the wing 5 includes an upper wing surface 15 and a lower wing surface 16 joined by a front spar 11 of the wing structure 6. In various embodiments, the telescoping mechanism 100 may be used to control the movement of aerodynamic wing surfaces such as leading edge slats, trailing edge flaps, flaperons, or ailerons, for example and without limitation.

A slat panel 120 extends along a leading edge of the wing structure 6. While one slat panel 120 is shown, it is understood that the aircraft wing 5 may include a plurality of slats 120 extending spanwise across the leading edge of the wing 5. Each slat panel 120 is extendable from and retractable to the leading edge 10 of the aircraft wing 5, as discussed herein. The slat panel 120 is coupled to a support arm 122. The support arm 122 supports the slat panel 120 as it is moved between an undeployed or retracted position to a deployed position and interfaces with the other components of the telescoping mechanism 100. In the illustrated embodiment, as shown in FIG. 2, the support arm 122 includes a forward roller 124 and an aft roller 126 coupled thereon.

Figure 2:
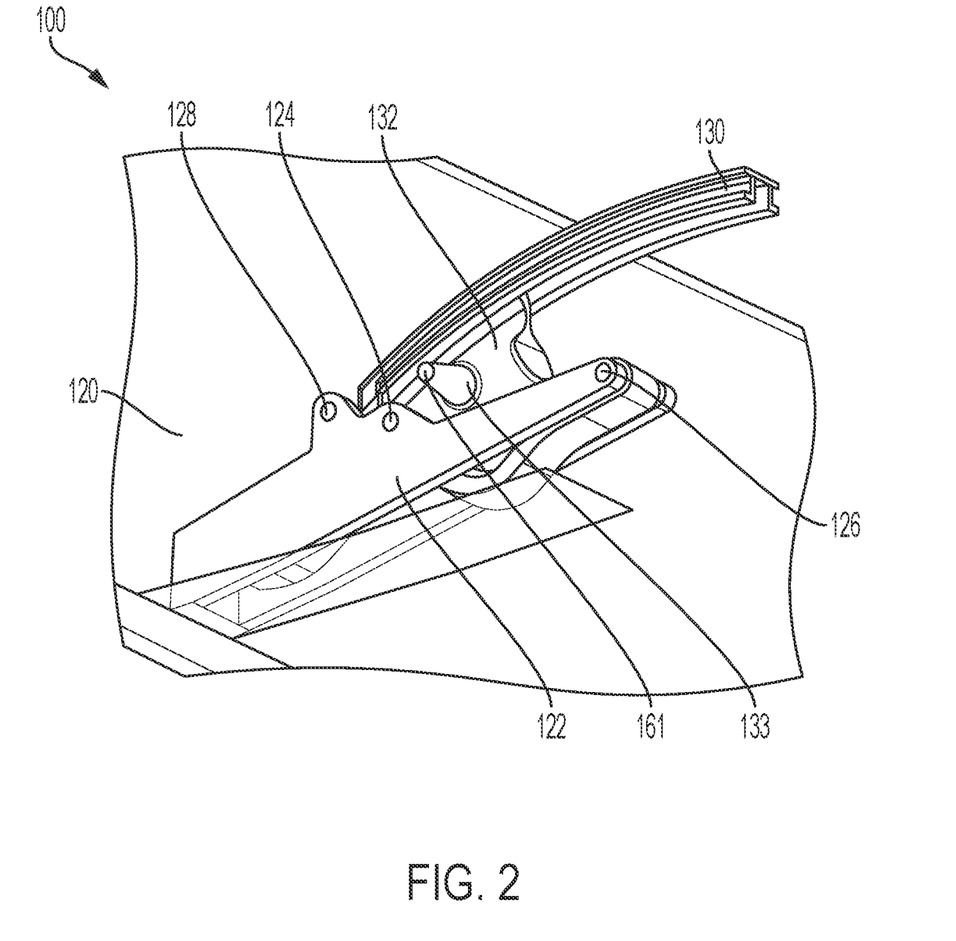
FIG. 2 is a schematic rear perspective representation of components of the telescoping mechanism of FIG. 1.

With continued reference to FIG. 2, the telescoping mechanism 100 includes a movable curved track 130. The track 130 is coupled to, or formed integrally with, a cam track plate 132. In various embodiments, the track 130 is mounted on rollers (not shown), with the rotational axis of each roller fixed to the wing structure 6, such as the rib 7. The cam track plate 132 is positioned forward of, and translates fore and aft relative to, the forward edge 9 of the wing structure 6.

With reference to FIGS. 3 and 4, the cam track plate 132 includes a forward cam track 134 and an aft cam track 144. The forward cam track 134 includes a forward cam track opening 135 defined by a forward cam track edge 136. The forward cam track 134 has a first end 137 and a second end 138 forward of the first end 137. A first inflection point 139 of the forward cam track 134 is positioned between the first end 137 and the second end 138. Similarly, the aft cam track 144 includes an aft cam track opening 145 defined by an aft cam track edge 146. The aft cam track 144 has a first end 147 and a second end 148 forward of the first end 147. A second inflection point 149 of the aft cam track 144 is positioned between the first end 147 and the second end 148. As shown in FIG. 3, the second end 148 of the aft cam track 144 is positioned higher relative to the second end 138 of the forward cam track 134 to enable increased camber of the wing 5 as the slat panel 120 is positioned toward a fully deployed position. The telescoping mechanism 100 illustrated in FIGS. 1-8 is a dual pivot telescoping mechanism due to the shape and layout of the forward and aft cam tracks 134, 144.

With continued reference to FIGS. 3 and 4, in the illustrated embodiment, the movable curved track 130 includes a gear rack 152 having a plurality of gear teeth 153. A pinion gear 154 including a plurality of gear teeth 155 is rotatably coupled at a first attachment point 156 to the wing structure 6, for example, to the rib 7. The pinion gear 154 is coupled with an actuator 30 which drives rotation of the pinion gear 154 about the first attachment point 156. Engagement of the plurality of gear teeth 155 of the pinion gear 154 with the plurality of gear teeth 153 of the gear rack 152 enables fore and aft movement of the movable curved track 130 and the cam track plate 132 relative to the wing structure 6. In various embodiments, the deployed or retracted position of the slat panel 120 is related to the rotational position of the pinion gear 154.

In various embodiments, the pinion gear 154 is coupled with the actuator 30 that is in communication with a controller 22. The actuator 30 receives one or more control signals from the controller 22 to control extension and retraction of the leading edge slat panel 120 via the telescoping mechanism 100. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the telescoping mechanism 100.

Figure 1:
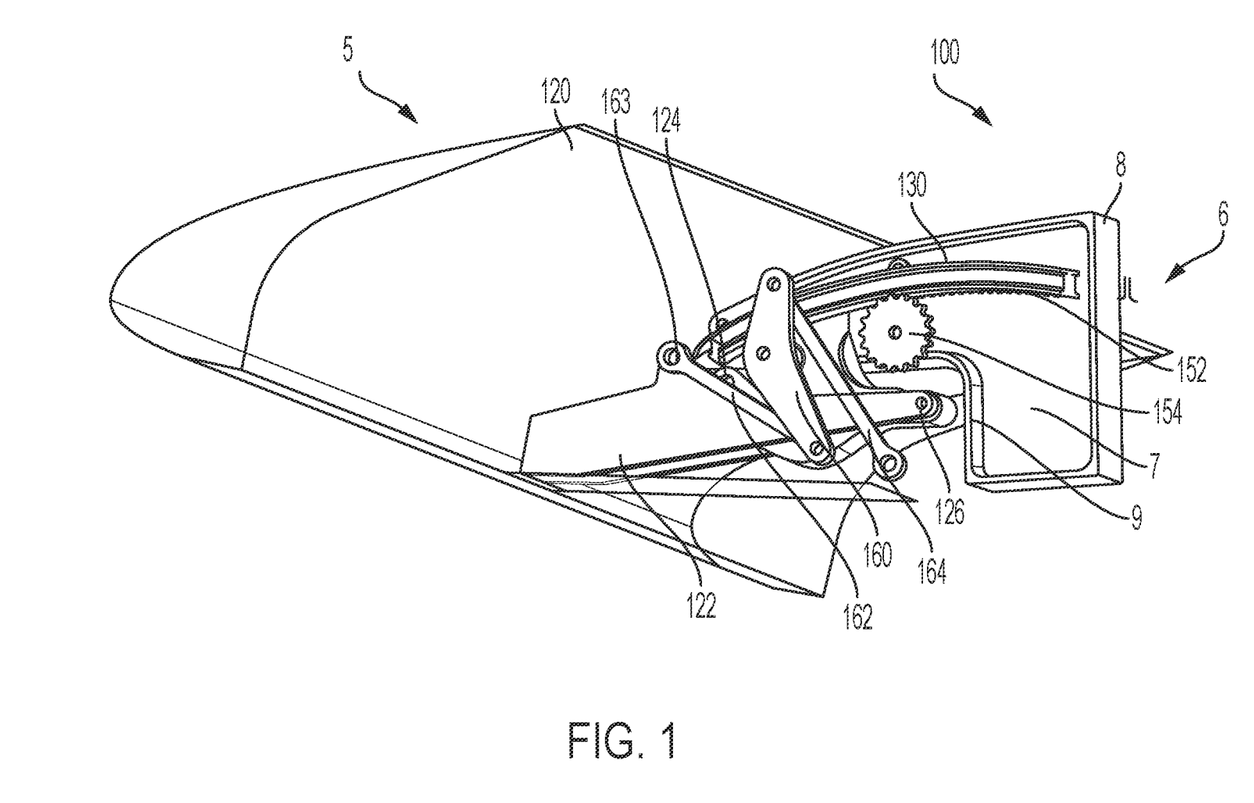
FIG. 1 is a schematic rear perspective representation of a telescoping mechanism, according to an embodiment.

The telescoping mechanism 100 further includes a linkage mechanism including a bell crank 160. With reference to FIGS. 1 and 4, the bell crank 160 has a forward end 165 coupled by a forward link 162 to the support arm 122 at a forward attachment point 163 and an aft end 167 coupled by an aft link 164 to the wing structure 6 at an aft attachment point 169. The bell crank 160 is pivotally mounted to the cam track plate 132 at a bell crank attachment point 161. The attachment point 161 is positioned at an end of a tower 133 (as best shown in FIGS. 2 and 3) to laterally offset the bell crank 160 from the support arm 122 and the cam track plate 132 and allow the bell crank 160, the forward link 162, and the aft link 164 to rotate independently of the cam track plate 132. As shown in FIG. 1, the bell crank 160 is positioned laterally outward of the support arm 122 such that the support arm 122 is positioned between the bell crank 160 and the cam track plate 132. The aft link 164 is fixedly coupled to the wing structure 6 at the aft attachment point 169, as shown in FIGS. 5-8.

Forward movement of the curved track 130 and the cam track plate 132 is initiated by engagement between the pinion gear 154 and the gear rack 152. As the curved track 130 and the cam track plate 132 rotate and translate forward, the bell crank 160 also translates forward and rotates relative to the wing structure 6. The rotation of the bell crank 160 applies force on the support arm 122 via the forward link 162 at the forward attachment point 163. The forward roller 124 of the support arm 122 is disposed within the forward cam track 134. Similarly, the aft roller 126 of the support arm 122 is disposed within the aft cam track 144. Rotation and translation of the bell crank 160 and the cam track plate 132 cause forward displacement of the support arm 122 and translation of the forward roller 124 within the forward cam track 134 and the aft roller 126 within the aft cam track 144. Translation of the forward and aft rollers 124, 126 respectively within the forward and aft cam tracks 134, 144 causes the slat panel 120 to both extend away from and rotate downward relative to the leading edge of the wing 5. The configuration of the forward and aft cam tracks 134, 144 create additional degrees of freedom of the telescoping mechanism 100. When the forward roller 124 is positioned at the second end of the forward cam track 134 and the aft roller 126 is positioned at the second end of the aft cam track 144, the aft roller 126 is positioned higher than the forward roller 124 such that the forward and aft cam tracks 134, 144 create increased downward displacement of the forward roller 124 relative to the aft roller 126 when the leading edge slat panel 120 is extended toward the deployed position.

The extension and rotation of the slat panel 120 relative to a leading edge 10 of the wing 5 using an embodiment of the telescoping mechanism 100 is shown in FIGS. 5-8. In FIG. 5, the slat panel 120 is in a first, or retracted, position 201 relative to the leading edge 10 of the wing 5. The forward roller 124 of the support arm 122 is positioned toward, near, and/or at the first end 137 of the forward cam track 134. The aft roller 126 of the support arm 122 is positioned toward, near, and/or at the first end 147 of the aft cam track 144. In the illustrated embodiment, a pair of rollers 128, 129 are rotatably coupled to the wing structure 6, such as the rib 7. The pair of rollers 128, 129 are in bearing contact with the curved track 130.

Figure 6:
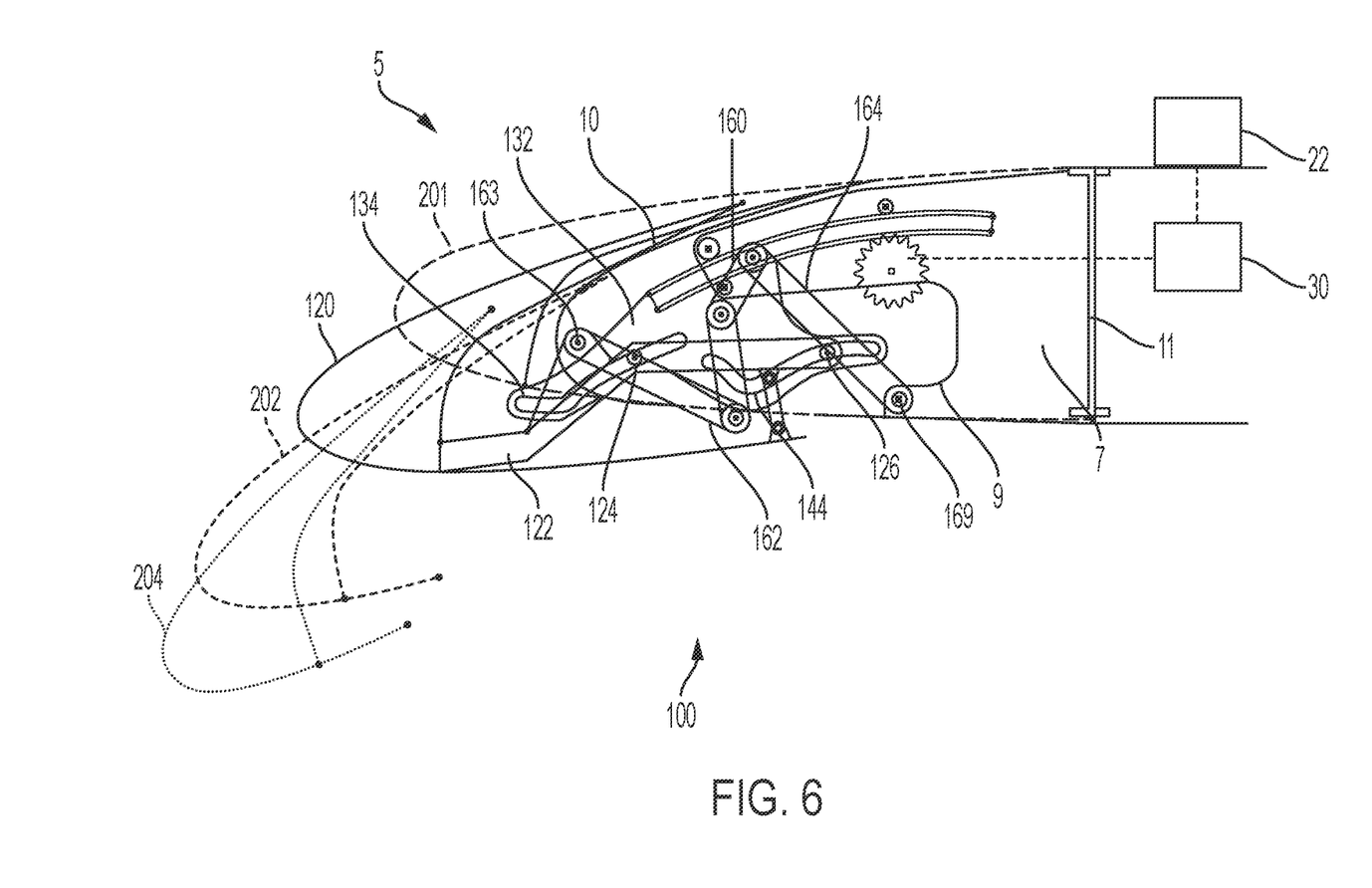
FIG. 6 is a schematic side view representation of the telescoping mechanism in a second position, according to an embodiment.

Rotation of the pinion gear 154 and engagement of the pinion gear 154 with the gear rack 152 cause the slat panel 120 to extend forward and rotate downward to an intermediate position as shown in FIG. 6. The rotation and extension of the cam track plate 132 induce rotation of the bell crank 160 and the forward link 162 coupled with the support arm 122. As the bell crank 160 rotates in a clockwise direction, the bell crank 160 extends the forward link 162 forward. The forward or extension action of the forward link 162 causes the support arm 122 to extend forward. The forward or extension motion of the support arm 162 causes the forward roller 124 to translate forward within the forward cam track 134 and the aft roller 126 to translate forward within the aft cam track 144. Each of the forward and aft cam tracks 134, 144 initially extend generally forward from the first ends 137, 147, as shown most clearly in FIG. 3. The forward cam track 134 has a greater downward slope from the first end 137 as compared to the aft cam track 144, causing the slat panel 120 to rotate downward.

The intermediate position of the slat panel 120 shown in FIG. 6 illustrates one example of the flexibility in movement of the aerodynamic surface allowed by the forward and aft cam tracks 134, 144. In various embodiments, depending on the shape of the wing 5, the type of aircraft, and the shape of the aerodynamic surface, such as the slat panel 120, for example and without limitation, the shape of each track may be tuned in order to lift the trailing edge of the slat panel 120 away from the upper wing surface 15 to minimize scrubbing, and also allow the aerodynamic shape of the upper wing surface 15 to be optimally tuned when the upper wing surface 15 that is covered by the trailing edge of the slat panel 120 is exposed during takeoff and landing conditions, as shown in FIGS. 7 and 8.

Figure 7:
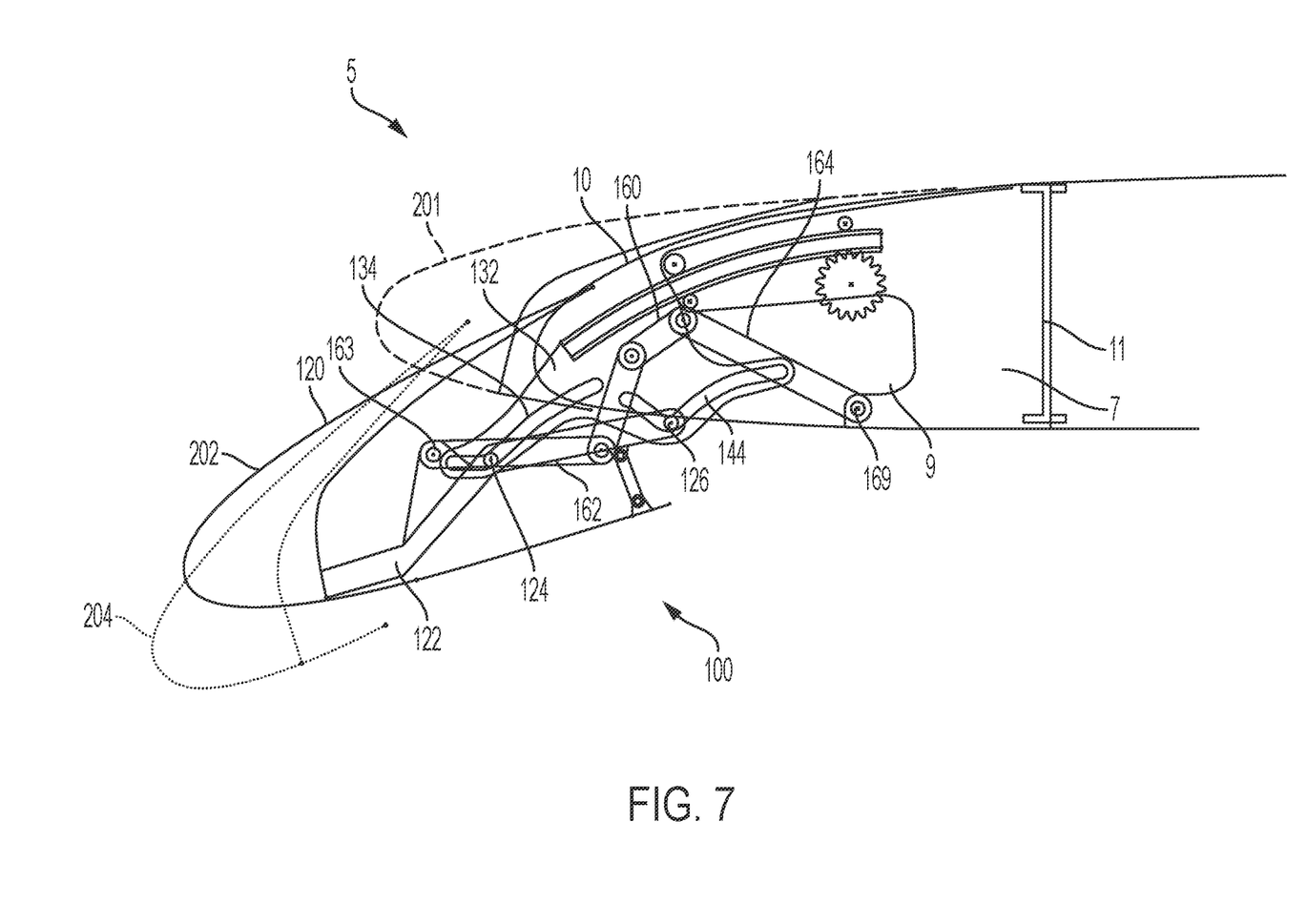
FIG. 7 is a schematic side view representation of the telescoping mechanism in a third position, according to an embodiment.

Continued forward translation of the forward roller 124 within the forward cam track 134 and the aft roller 126 within the aft cam track 144 causes forward and downward movement of the curved track 130 and the cam track plate 132 to rotate and extend the slat panel 120 to the takeoff condition position 202, as shown in FIG. 7. The takeoff condition position 202 is an intermediate position between a fully deployed position and a fully retracted position. In the takeoff condition position 202, the slat panel 120 extends the leading edge 10 of the wing 5 forward and downward to increase camber and lift for a takeoff condition. In this position, the rotation of the bell crank 160 extends the forward link 162 such that the support arm 122 and the slat panel 120 are extended further forward and downward from the position of the slat panel 120 shown in FIG. 6. The forward roller 124 is positioned at the first inflection point 139 of the forward cam track 134. The aft roller 126 is positioned at the second inflection point 149 of the aft cam track 144. The aft roller 126 is lower than the forward roller 124 when the aft roller 126 is at the second inflection point 149 and the aft roller 126 is higher than the forward roller 124 when the leading edge slat panel 120 is at the deployed position.

Between the fully retracted position shown in FIG. 5 and the takeoff condition position 202, both of the forward and aft cam tracks 134, 144 slope generally downward. However, at the second inflection point 149, the aft cam track 144 slopes generally upward while the at the first inflection point, the forward cam track 134 extends generally forward. The resulting position of the slat panel 120 due to the travel of the forward and aft rollers 124, 126 within the forward and aft cam tracks 134, 144 is shown in FIG. 8.

Figure 8:
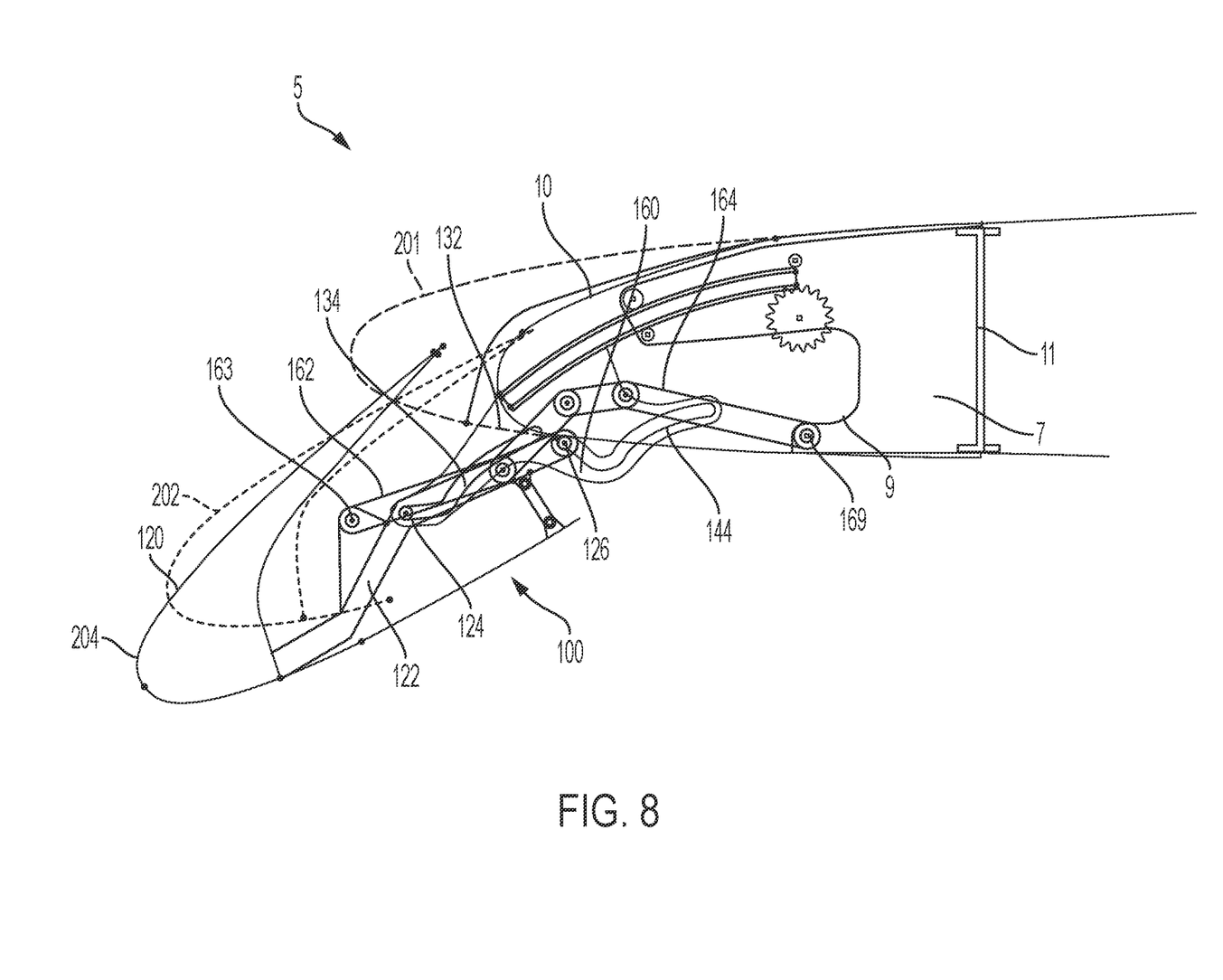
FIG. 8 is a schematic side view representation of the telescoping mechanism in a fourth position, according to an embodiment.

FIG. 8 illustrates the slat panel 120 in a landing condition position 204. When in the landing condition position 204, the slat panel 120 is in a fully deployed position. In this position, the bell crank 160 acts on the forward link 162 to further extend and rotate the support member 122 and the slat panel 120 relative to the leading edge 10 of the wing 5. The forward roller 124 is positioned toward, near, and/or at the second end 138 of the forward cam track 134. The aft roller 126 is positioned toward, near, and/or at the second end 148 of the aft cam track 144. As most clearly seen in FIG. 3, the aft cam track 144 slopes upward from the second inflection point 149 to the second end 148. Travel of the aft roller 126 along this upward sloping portion of the aft cam track 144 acts to further rotate the support arm 122 and the slat panel 120 to the fully deployed position 204 shown in FIG. 8. Furthermore, the increased downward displacement of the forward roller 124 relative to the aft roller 126 due to both the rotation of the support member 122 relative to the wing structure 6 and the movement of the forward and aft rollers 124, 126 within the cam tracks causes the downward rotation of the slat panel 120 and increased camber of the slat panel 120.

FIGS. 1-8 illustrate one embodiment of the telescoping mechanism 100. In some embodiments, as shown in FIG. 1, the forward cam track 134 extends laterally through the cam track plate 132 to form the forward cam track opening 135 and the aft cam track 144 extends laterally through the cam track plate 132 to form the aft cam track opening 145. In some embodiments, the telescoping mechanism 100 includes two support arms 122 coupled to each slat. In various embodiments, one support arm 122 is positioned on a first side of the cam track plate 132 and a second support arm 122 is positioned on an opposite side of the cam track plate 132. In various embodiments, the each of the forward cam track 134 and the aft cam track 144 is a groove formed in a side surface of the cam track plate 132.

Figure 9:
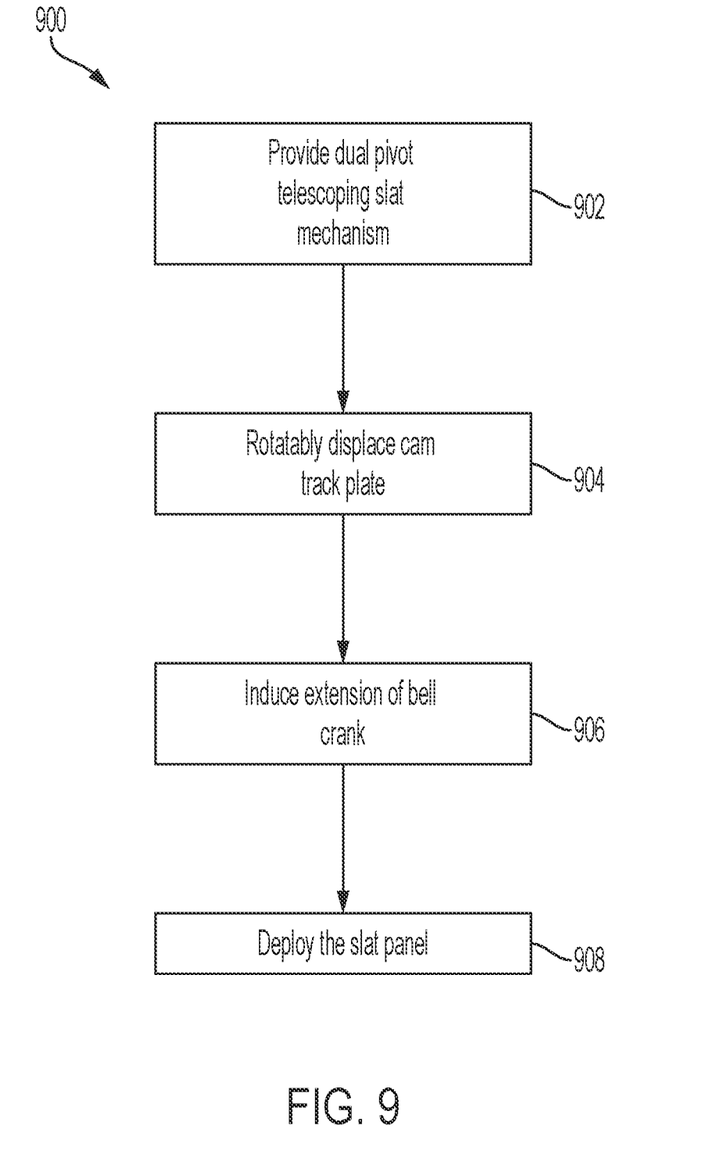
FIG. 9 is a flow chart diagram of a method for actuation of a leading edge slat panel using the telescoping mechanism described herein, according to an embodiment.

FIG. 9 is a flow chart diagram of a method 900 for actuation of a leading edge slat panel for an aircraft. The method 900 can be utilized in connection with the telescoping mechanism 100 discussed herein. The method 900 can be utilized in connection with the controller 22 as discussed herein, or by other systems associated with or separate from the vehicle, in accordance with exemplary embodiments. The order of operation of the method 900 is not limited to the sequential execution as illustrated in FIG. 9, but may be performed in one or more varying orders, or steps may be performed simultaneously, as applicable in accordance with the present disclosure.

Beginning at 902, a telescoping mechanism, such as the telescoping mechanism 100 discussed herein, is provided. In various embodiments, the telescoping mechanism 100 includes the cam track plate 132 having the forward cam track 134 and the aft cam track 144, the support arm 122 coupled to the leading edge slat panel 120. The support arm 122 includes the forward roller 124 and the aft roller 126 thereon, the forward roller 124 disposed in the forward cam track 134 and the aft roller 126 disposed in the aft cam track 144. The bell crank 160 is pivotally mounted to the cam track plate 132. The aft end 167 of the bell crank 160 is coupled by the aft link 164 to the wing structure 6 and the forward end 165 is coupled by the forward link 162 to the support arm 122. In various embodiments, the telescoping mechanism 100 also includes the pinion gear 154 rotatably coupled to the wing structure 6 of the aircraft and the curved track 130 coupled to the cam track plate 132. The gear rack 152 of the curved track 132 is engaged with the pinion gear 154. In various embodiments, the pinion gear 154 is coupled with the actuator 30. The actuator 30 is in electronic communication with the controller 22 and receives one or more control signals to control rotation of the pinion gear 154 and thereby extension and retraction leading edge slat panel 120.

Next, at 904, the cam track plate 132 is rotatably displaced. The displacement of the cam track 132 is accomplished, in various embodiments, via displacement of the curved track 130 resulting from engagement of the gear rack 152 of the curved track 132 with the rotating pinion gear 154.

At 906, the bell crank 160 is extended. Extension of the bell crank 160 results in rotation and translation of the bell crank 160 relative to the wing structure 6. As discussed herein, extension of the bell crank 160 causes the forward roller 124 to translate within the forward cam track 134 and the aft roller 126 to translate within the aft cam track 144 to cause downward rotation of the leading edge slat panel 120 and increased camber of the leading edge slat panel 120 as the leading edge slat panel 120 is extended toward a fully deployed position, such as the landing position 204 shown in FIG. 8.

Finally, at 908, the lead edge slat panel 120 is deployed via the displacement of the cam track panel 132 and the extension of the bell crank 160. The leading edge slat panel 120 is deployed to various positions between the retracted or undeployed position shown in FIG. 5 and the fully deployed position shown in FIG. 8. The position of the forward roller 124 within the forward cam track 134 and the aft roller 126 within the aft cam track 144 positions the leading edge slat panel 120 at various angles relative to the leading edge 10 of the wing 5, as shown in FIGS. 5-8.

Figure 10:
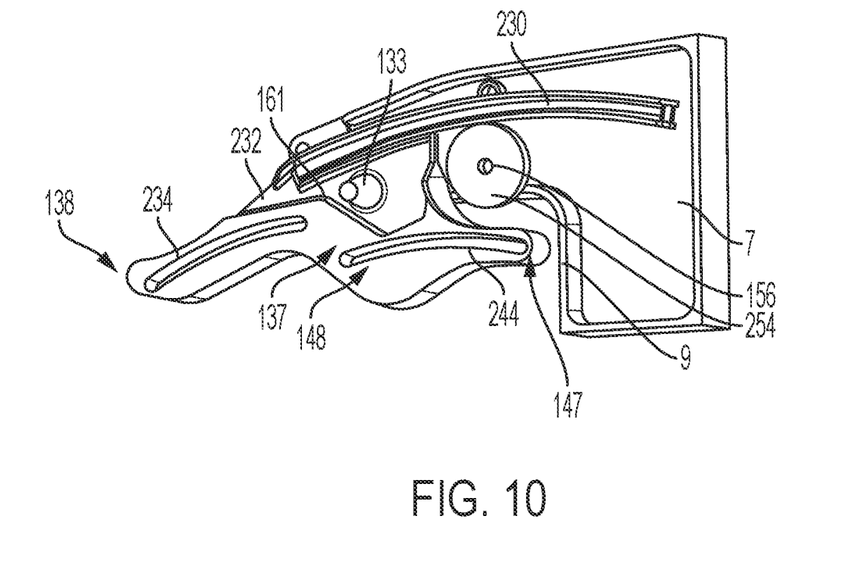
FIG. 10 is a schematic rear perspective representation of components of a telescoping mechanism, according to another embodiment.
Figure 11:
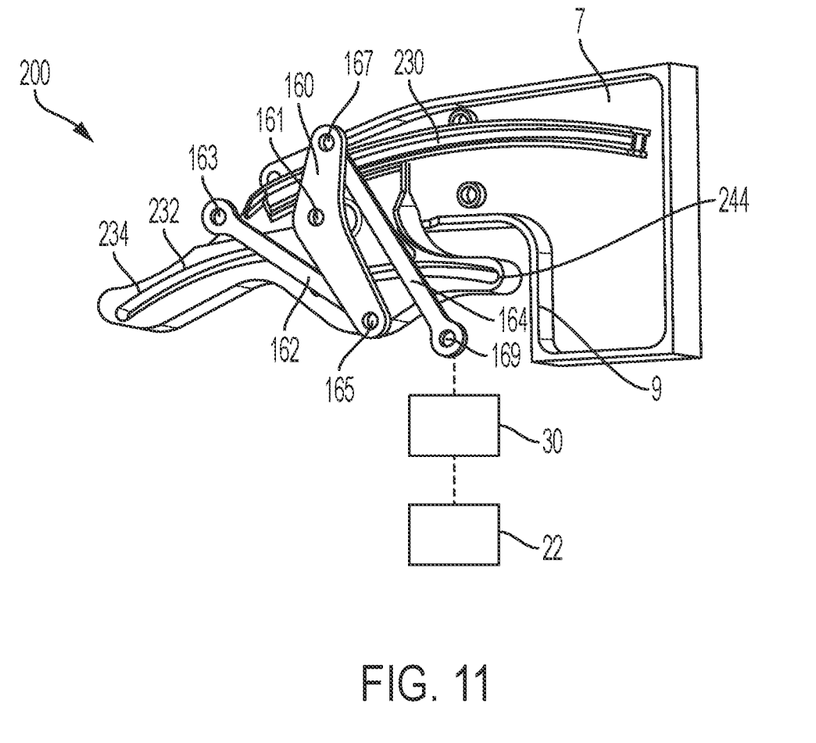
FIG. 11 is a schematic rear perspective representation of components of a telescoping mechanism, according to another embodiment.

FIGS. 10 and 11 illustrate another embodiment of a cam track plate 232 for a telescoping mechanism 200 to control the movement of an aerodynamic surface, such as the slat panel 120, relative to a fixed wing 5. The cam track plate 232 includes a forward cam track 234 and an aft cam track 244. The forward cam track 234 has a first end 137 and a second end 138 forward of the first end 137. Similarly, the aft cam track 244 has a first end 147 and a second end 148 forward of the first end 147. As shown in FIG. 10, the second end 148 of the aft cam track 244 is positioned higher relative to the second end 138 of the forward cam track 234 to enable increased camber of the wing 5 as the slat panel 120 is positioned toward a fully deployed position. In this embodiment, the forward and aft cam tracks 234, 244 describe circular arcs that are concentric with the arc defined by the movable curved track 230. When the forward and aft cam tracks 234, 244 are concentric with the movable curved track 230, the aerodynamic surface moves in a single pivot motion relative to the wing structure 6. When used with the slat panel 120, the telescoping mechanism 200 having a single pivot motion retains the desired increased camber as discussed above with respect to the telescoping mechanism 100.

With continued reference to FIGS. 10 and 11, in the illustrated embodiment, the movable curved track 230 interfaces with a roller 254. In this embodiment, torque is applied to the aft link 164 to actuate the telescoping mechanism 200. The actuator 30, such as a linear actuator, for example and without limitation, is in electronic communication with a controller, such as the controller 22, and drives rotation of the aft link 164 in a counter-clockwise direction to actuate the telescoping mechanism 200.

The telescoping mechanism 100, 200 discussed herein may be driven or actuated in various ways, such as via the rack and pinion gear system discussed with respect to the telescoping mechanism 100 or via a torque applied to the aft link 164 of the bell crank linkage, as discussed with respect to the telescoping mechanism 200. In various embodiments, the pinion gear 154 discussed with respect to the telescoping mechanism 100 shown in FIGS. 1-4 may be replaced by a roller 254 and the telescoping mechanism 100 is actuated by a torque applied to the aft link 164.

While the telescoping mechanism 100, 200 are discussed and illustrated herein with respect to the control of a leading edge slat, such as the slat panel 120, each of the telescoping mechanism 100, 200 may be used to control the fore and aft movement of other aerodynamic surfaces located on either or both of the leading edge or trailing edge of the wing 5, such as, for example and without limitation, trailing edge flaps, flaperons, or ailerons.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states, Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An actuation apparatus for a leading edge slat panel for an aircraft, comprising:
    a pinion gear rotatably couplable to a wing structure of the aircraft;
    a curved track having a gear rack engaged with the pinion gear;
    a cam track plate coupled to the curved track, the cam track plate having a forward cam track and an aft cam track;
    a support arm couplable to the leading edge slat panel, the support arm having a forward roller and an aft roller thereon, the forward roller disposed in the forward cam track and the aft roller disposed in the aft cam track; and
    a bell crank pivotally mounted to the cam track plate, the bell crank having an aft end couplable by an aft link to the wing structure and a forward end coupled by a forward link to the support arm;
    wherein the curved track and the cam track plate are movable fore and aft by engaging the gear rack with the pinion gear and by forward movement of the curved track and the cam track plate rotates the bell crank to create forward displacement of the support arm and downward rotation of the leading edge slat panel toward a deployed position.

2. The actuation apparatus of claim 1, wherein the forward roller translates within the forward cam track and the aft roller translates within the aft cam track to cause downward rotation of the leading edge slat panel and increased camber of the leading edge slat panel as the leading edge slat panel is extended toward the deployed position.

3. The actuation apparatus of claim 1, wherein the forward cam track has a first end and a second end forward of the first end of the forward cam track, the aft cam track has a first end and a second end forward of the first end of the aft cam track, and the second end of the aft cam track is positioned higher relative to the second end of the forward cam track to create increased downward displacement of the forward roller relative to the aft roller when the leading edge slat panel is extended toward the deployed position.

4. The actuation apparatus of claim 3, wherein the forward cam track includes a first inflection point and the aft cam track includes a second inflection point such that as the forward roller translates within the forward cam track and the aft roller translates within the aft cam track, the aft roller is lower than the forward roller when the aft roller is at the second inflection point and the aft roller is higher than the forward roller when the leading edge slat panel is at the deployed position.

5. The actuation apparatus of claim 1, wherein the forward cam track extends laterally through the cam track plate to form a forward cam track opening and the aft cam track extends laterally through the cam track plate to form an aft cam track opening and the support arm includes a first support arm member positioned on a first side of the cam track plate and a second support arm member positioned on a second side of the cam track plate.

6. The actuation apparatus of claim 1, wherein each of the forward cam track and the aft cam track is a groove formed in a side surface of the cam track plate.

7. The actuation apparatus of claim 1, wherein the cam track plate is positionable forward of and translatable fore and aft relative to a forward edge of the wing structure.

8. The actuation apparatus of claim 1, wherein the aft link of the bell crank is fixedly couplable to the wing structure, and the bell crank is configured to both rotate and translate fore and aft relative to the wing structure.

9. An aircraft wing including the actuation apparatus of claim 1, the aircraft wing comprising:
    an upper wing surface and a lower wing surface joined by the wing structure; and
    the leading edge slat panel;

wherein the leading edge slat panel is coupled to the support arm having the forward roller and the aft roller, and the pinion gear is rotatably couplable to the wing structure.

10. A method for actuation of a leading edge slat panel for an aircraft, comprising:
providing a telescoping mechanism comprising a cam track plate having a forward cam track and an aft cam track, a support arm coupled to the leading edge slat panel, the support arm having a forward roller and an aft roller thereon, the forward roller disposed in the forward cam track and the aft roller disposed in the aft cam track, and a bell crank pivotally mounted to the cam track plate, the bell crank having an aft end coupled by an aft link to a wing structure and a forward end coupled by a forward link to the support arm;
rotatably displacing the cam track plate;
inducing, via the displacement of the cam track plate, extension of the bell crank; and
deploying, via the displacement of the cam track plate and extension of the bell crank, the leading edge slat panel depending from the support arm, where extension of the bell crank causes the forward roller to translate within the forward cam track and the aft roller to translate within the aft cam track to cause downward rotation of the leading edge slat panel and increases a camber of the leading edge slat panel as the leading edge slat panel is extended toward a fully deployed position.

11. The method of claim 10 further comprising:
providing a pinion gear rotatably coupled to the wing structure of the aircraft and providing a curved track coupled to the cam track plate, the curved track having a gear rack engaged with the pinion gear; and
rotatably operating the pinion gear to cause the gear rack engaged with the pinion gear to rotatably displace the curved track and the cam track plate in a forward direction.

12. The method of claim 11 further comprising rotatably operating the pinion gear to induce, via displacement of the cam track plate, extension of the bell crank such that the forward roller is positioned within the forward cam track at a first inflection point and the aft roller is positioned within the aft cam track at a second inflection point such that the leading edge slat panel is in a takeoff condition position.

13. The method of claim 11 further comprising rotatably operating the pinion gear to induce, via displacement of the cam track plate, extension of the bell crank such that the forward roller is positioned at a forward end of the forward cam track and the aft roller is positioned at a forward end of the aft cam track such that the leading edge slat panel is in a landing condition position.

14. The method of claim 10 further comprising rotatably displacing the cam track plate forward and aft relative to a forward edge of the wing structure of the aircraft as the leading edge slat panel is positioned between an undeployed and a deployed position.

15. An actuation apparatus for an aerodynamic surface of an aircraft, comprising:
a roller rotatably couplable to a wing structure of the aircraft;
a curved track in movable engagement with the roller;
a cam track plate having a forward cam track and an aft cam track;
a support arm coupled to the aerodynamic surface, the support arm having a forward roller and an aft roller thereon, the forward roller disposed in the forward cam track and the aft roller disposed in the aft cam track;
a bell crank pivotally mounted to the cam track plate, the bell crank having an aft end couplable by an aft link to the wing structure and a forward end coupled by a forward link to the support arm; and
an actuator coupled with the aft link;
wherein the curved track and the cam track plate are movable fore and aft by the actuator coupled with the aft link, the forward roller translates within the forward cam track, and the aft roller translates within the aft cam track to cause downward rotation of the aerodynamic surface and increased camber of the aerodynamic surface as the aerodynamic surface is extended toward a deployed position.

16. The actuation apparatus of claim 15, wherein the forward cam track and the aft cam track are circular arcs and are concentric with a circular arc defined by the curved track.

17. The actuation apparatus of claim 15, wherein the forward cam track has a first end and a second end forward of the first end of the forward cam track, the aft cam track has a first end and a second end forward of the first end of the aft cam track, and the second end of the forward cam track is lower than the second end of the aft cam track to create increased downward displacement of the forward roller relative to the aft roller when the aerodynamic surface is extended toward the deployed position.

18. The actuation apparatus of claim 15, wherein the forward cam track includes a first inflection point and the aft cam track includes a second inflection point such that as the forward roller translates within the forward cam track and the aft roller translates within the aft cam track, the aft roller is lower than the forward roller when the aft roller is at the second inflection point and the aft roller is higher than the forward roller when the aerodynamic surface is at the deployed position.

19. The actuation apparatus of claim 15, wherein the cam track plate is positionable forward of and translatable fore and aft relative to a forward edge of the wing structure.

20. The actuation apparatus of claim 15, wherein the aft link of the bell crank is fixedly couplable to the wing structure and the bell crank is configured to rotate and translate fore and aft relative to the wing structure.

* * * * *